UNITED STATES PATENT OFFICE.

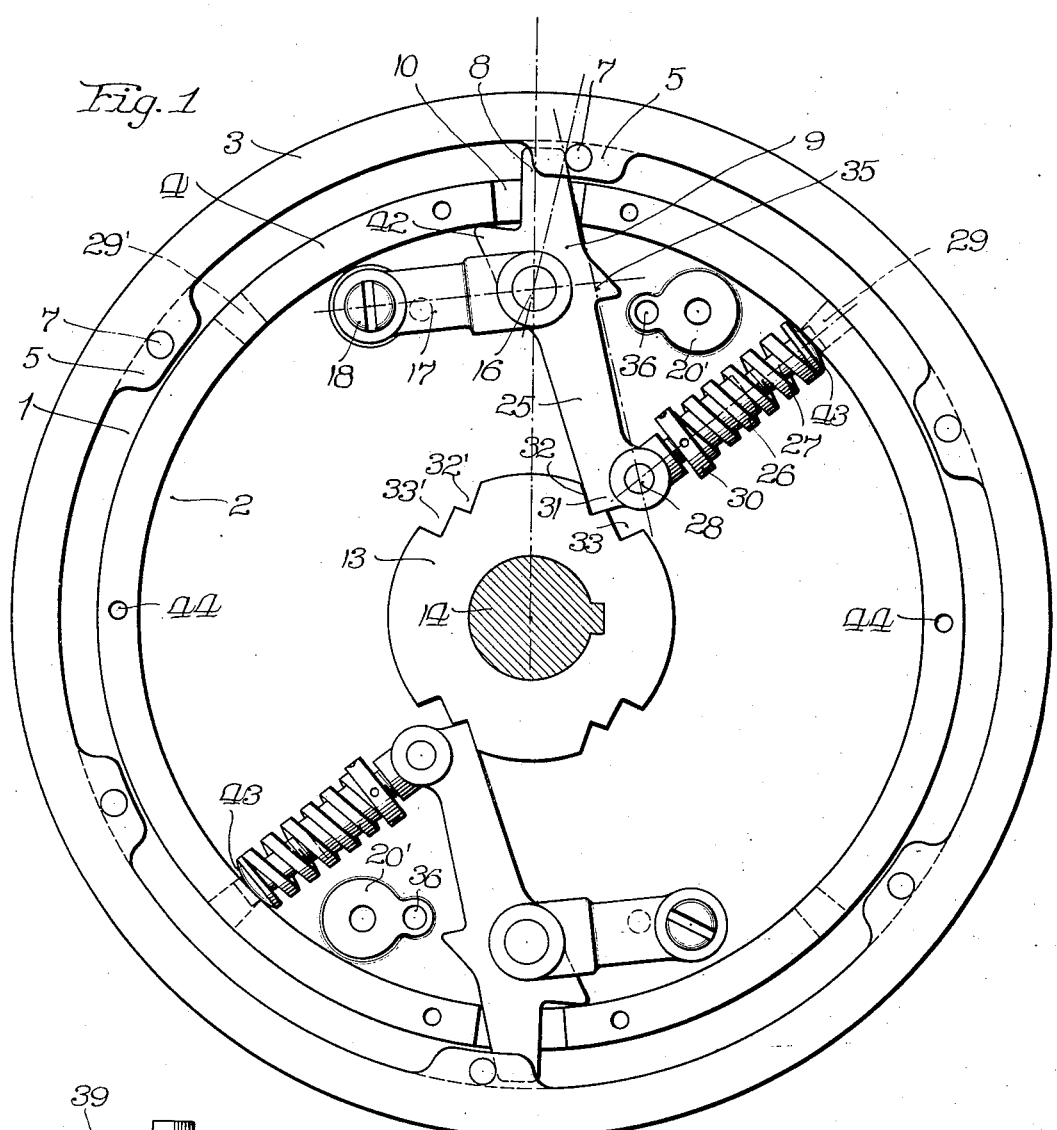
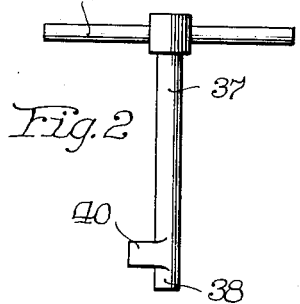

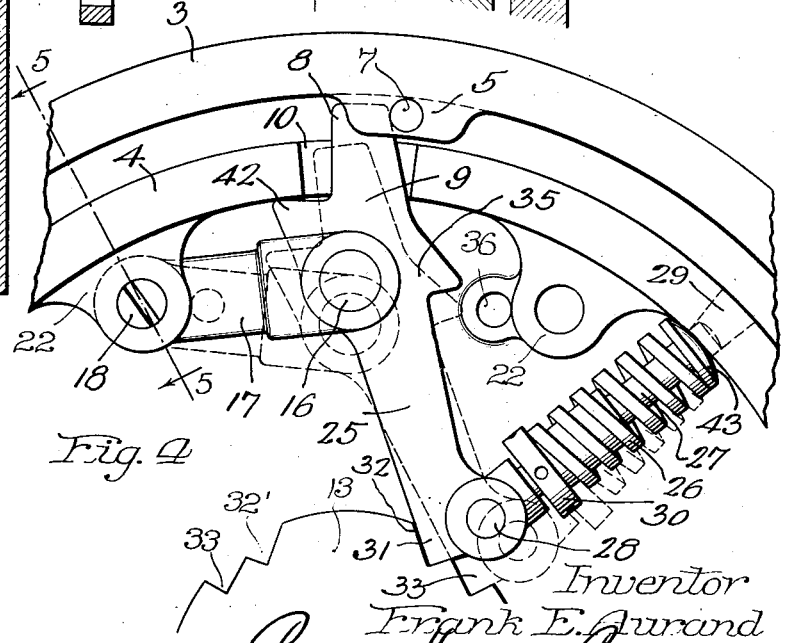

FRANK E. AURAND, OF OAK PARK, ILLINOIS, ASSIGNOR OF ONE-HALF TO HENRY R. WAHL, OF CHICAGO, ILLINOIS.

CLUTCH.

1,306,513.      Specification of Letters Patent.     Patented June 10, 1919.

Application filed January 18, 1918. Serial No. 212,400.

*To all whom it may concern:*

Be it known that I, FRANK E. AURAND, a citizen of the United States, residing in Oak Park, in the county of Cook and State of Illinois, have invented a certain new and useful Improvement in Clutches, of which the following is a full, clear, concise, and exact description, reference being had to the accompanying drawings, forming a part of this specification.

My invention relates to clutches.

Many classes of machinery offer variations in load, to the driving motor. These variations take different forms and must be dealt with in different fashions. A gradual increase and decrease within the capacity of the driving motor, or the driven machine, is best taken care of by a suitable governing device for controlling the power.

Sharp transient irregularities, in the nature of jars or shocks, are best met by interposing a yielding clutch arrangement, such as a friction clutch between driving and driven parts. But where the irregularity of load amounts to stalling of the driving or driven parts, as by an excessive load, which jams or obstructs the machine or driven part, such remedial means is inadequate. The only way that the normal operation can be restored under the latter conditions is by removing the excessive load or obstruction. In such case the power must be shut off from the particular machine, otherwise the machine or the motor may be seriously damaged.

It is with the latter conditions that my invention is particularly concerned. One particular class of machinery with which I am familiar, and in connection with which my invention is particularly valuable, is coal handling and conveying. The invention is applicable to many other situations, the above being merely by way of illustration.

The object of the present invention is to provide a clutch for transmitting power as from a driving shaft or member, to a driven shaft or member, which clutch will release and completely disengage the members when a predetermined resistance is encountered.

I accomplish this by making the clutch of two main parts, comprising a driven part and a driving part, with an element between them for connecting the parts. This connecting element is subjected to the stress or torque between the parts and is arranged to trip out of connection when the torque or stress exceeds a predetermined amount, as determined by a graduated governing spring.

In the preferred form of my invention the connecting element takes the form of a lever or balance arm, one end being adapted to receive a predetermined stress imposed by the graduated spring and to be held against a stop, the other end being adapted to receive the circumferential or tangential stress between parts. When the circumferential or tangential stress exceeds the holding power of the spring, the balance arm is shifted out of engagement with the stop and is so moved as to disengage the coöperating part of the clutch. The arm is then caught and held in the disengaged position until the clutch is reset.

Resetting is accomplished by means of a resetting member, preferably in the form of a special tool, or key, which moves the balance arm from the catch, back into engagement with the stop and the other end of the lever then engages the coöperating clutch part to connect the two clutch parts together. The key may be dispensed with and a collar with suitable wings, or arms, may be mounted on the hub, particularly in the case of small machinery, to permit the clutch to be reset by means of a partial turn of the collar by hand.

In the preferred form of my invention, the balance lever is mounted to have both a rocking motion about its pivot and a motion of translation, by mounting the pivot upon a link, which link is in turn pivoted upon one of the clutch parts.

The spring is so connected to the lever as to tend to oppose motion of rotation but to tend to aid motion of translation. The stop for the lever is a notch into which the lever normally takes. This stop is arranged to receive the thrust of the spring, both with regard to the motion of rotation and with regard to the motion of translation. The tangential, or circumferential, stress is adapted to oppose that part of the stress of the spring which acts to rotate the lever, and is adapted to aid, or at least not to oppose, that part of the stress of the spring which tends to give the lever a motion of translation.

When the tangential or circumferential stress becomes great enough to overcome the rotational tendency of the spring, the end of the lever is moved out of the notch, or stop, and the translational stress or tendency is released, thereby shifting the balanced arm or lever laterally. This shifting is accomplished by the complete disengagement of the balance arm from the clutch part, which it previously engaged and the clutch runs free. The translational stress of the spring holds the lever in a second notch. The spring tension and the second notch form an effective catch for holding the lever in engagement.

The resetting key or device is adapted to impart to the lever a translational and rotational movement to restore it to a clutching position.

I do not intend to be limited to the preferred form, hereinafter specifically described, as it is obvious that the principles and operations above enunciated may appear in various embodiments within the scope of the invention.

In order to inform those skilled in the art how to put my invention into practice, I shall now describe in detail one specific embodiment of my invention.

In the accompanying drawings,—

Figure 1 is a front, elevational view of the clutch of my invention with the cover-plate removed;

Fig. 2 is an elevation of the resetting key;

Fig. 3 is a vertical cross section of the clutch shown in Fig. 1;

Fig. 4 is a fragmentary, front elevational view of a modified form;

Fig. 5 is a fragmentary section, taken on the line 5—5 of Fig. 4; and

Fig. 6 is a similar section of the device shown in Fig. 1.

The clutch comprises the driving wheel or disk 2, and the driven wheel or disk 1. It is obvious that the relation of these parts may be reversed and that the disk or wheel 1 may be the driving member and the disk or wheel 2 may be the driven member. The disk 1 has a cylindrical flange 3 within which lies the disk 2. The disk 2 also has a cylindrical flange 4, lying within the flange 3. The flange 3 of the outer member has a plurality of lugs 5, which extend inward, these lugs being notched out as shown at 6 in Fig. 3, and having round pins 7 lying across the notches to engage the outer ends 8 of the levers 9, which form the connection between the parts 1 and 2. The outer ends of the levers 9 project through notches 10 in the flange 4. The outer member 1 is provided with a bolting flange 11 on its hub 12, for connecting this member or part to a gear wheel or the like. It is obvious that the hub 12 may be connected to a shaft, or wheel, or other rotatable part, from which or to which power is to be transmitted.

In the form shown, the inner member 2 is provided with a hub 13 which is keyed to the shaft 14. The hub 12 of the outer member has a loose bearing on the shaft 14 for the purpose of alining the parts 1 and 2.

While only one lever and connected parts is described, it will be noted that the drawing shows two of these connecting levers or balanced arms, but as the two are similar, only one will be specifically described.

The lever 9 is pivoted on a pin 16, borne in the end of a link 17, which link in turn is pivoted at its inner end to the pin 18. The pin 18, as shown in the detailed section of Fig. 6, comprises a shouldered machine screw having a cylindrical bearing portion, forming a bearing for the end of the link 17 and having a threaded part 19 which passes through a small boss 20 on the web of the wheel or disk. The pin 18 is provided with a filister head for attaching the same in place. The details of the mounting of the link 17 may be varied. The pin 18 may be riveted or otherwise fastened in place.

In Figs. 4 and 5, I have shown a lug 22 as extending out over the boss 20 so that the pin 18 may have a double bearing. This pin may be attached by screw threads or by riveting, or in any other preferred manner.

The lever 9 being pivoted on the end of the link 17 is capable of two kinds of motion, namely, a rotational motion about the pin 16 and a motion of translation by motion of the link 17 about its pivot 18. The inner end 25 of the lever 9 is connected to a compression spring 26 by means of the rod or plunger 27, which is pivoted to the arm 25 by means of the pin 28. The outer end of the rod or plunger 27 projects through a guiding opening 29 in the flange 4. This opening is flared out so that the pin 27 will not be bound within the opening by movement of the lever 25. The spring 26 is compressed between the flange 4 and the adjustable collar 30, which is screw threaded upon the rod or plunger 27. The inner end of the lever 9 is provided with a substantially square shoulder 31, which normally rests within the notch 32, in the hub 13. Immediately back of the notch 32 is a similar notch 33, into which the end or shoulder 31 of the lever 9 is adapted to be moved, when the lever 9 is tripped out of engaging position.

It will be noticed that the lever 9 stands slightly out of radial position and that the angle between the lever 9 and the plunger 27 is less than a right angle, so that the tension of the spring 26 has a double effect, namely, that of opposing rotation of the arm 25 and also tending to give the lever 9 a motion of translation; that is to say, of moving it from the notch 32 to the notch 33.

The rear wall of the notch 32 normally prevents the translational movement, but as soon as the end of the lever is swung against the tension of the spring 26 to such an extent that the shoulder 31 disengages, or rides out of the notch 32, the lever 9 will be slid into the notch 33.

The lever 9, when moved into the notch 33, disengages its outer end 8 from contact with any of the pins 7, so that the clutch parts run free of each other. The tendency of the spring 26 is to move the lever 9 farther inward, but this is prevented by the vertical wall of the notch 33.

The lever 9 is provided with a resetting shoulder 35 which normally lies adjacent a socket 36 formed in the web of the wheel or disk 2.

A resetting wrench or key 37, shown in Fig. 2, is adapted to have its lower end 38 inserted in the socket 36. Turning the handle 39 so that the bit or web 40 of the key engages the resetting shoulder 35 moves the inner end of the lever 9 from the notch 33 to the notch 32, and projects the outer end 8 through the slot 10, to such an extent as to bring this end of the lever into the path of the pin 7. The lever 9 is provided with a limiting shoulder 42 for preventing excessive outward movement of the lever during resetting and thereby preventing accidental release of the spring 26.

The device, as illustrated, is set for transmitting motion in one direction but the parts are so arranged and constructed as to permit the levers and springs to be transposed to permit driving in the opposite direction.

Thus, in Fig. 1, the pivot pin 18 may be shifted from the left side to the right side, the lever 9 being turned over, the plunger 27 being adapted to be guided in the opening 29' at the left of the figure, and the inner end 25 of the lever 9 being adapted to engage the notches 32' and 33'.

The operation of the device is as follows:

Assuming that the parts are in the position shown in Figs. 1 and 3, and that the disk 2 is connected to the driving motor through the shaft 14 and that the disk 1 is connected to the driven member or machine, the device is now adapted to transmit motion in clockwise direction. The thrust of the member 2 is transmitted to the pin 18, and through the link 17 to the pin 16. The driving thrust is here divided by the lever 9, part being transmitted to the pin 7 on the driven member 1, and the remainder being transmitted to the spring 26, the proportion of the thrust being in inverse ratio to the lever arm through which it is transmitted.

As the force exerted by the spring 26 is normally greater than the proportion of the driving thrust normally transmitted, the lever 9 remains stationary, its outer end 8 carrying the pin 7 and the driven member 1 along with it, thus driving the load.

When the resistance of the load becomes too great, as when the machine becomes blocked or stalled, the back pressure of the pin 7 upon the outer end 8 of the lever 9, overcomes the tension of the spring 26 and the shoulder 31 on the lever arm 25 is raised out of the notch 32. The camming action of the pin 7 and a component of the pressure of the spring 26 then operates to thrust the lever 9 inward, the shoulder 31 dropping into the notch 33 causing the end 8 to clear the pin 7. To aid free movement of the spring 26, the outer end of the spring rests upon a cylindrical or spherical washer 43, which permits of an easy rocking motion upon the inner surface of the flange 4.

A cylindrical cover plate 45 is normally fastened over the open side of the flange 4 by machine screws which are threaded into the openings 44 in the flange 4. This cover plate is provided with key-hole openings in line with the sockets 36 to permit of the introduction of the key 37 shown in Fig. 2.

The levers 9 being disconnected as shown in dotted lines in Fig. 4, the driving and driven parts are completely disconnected and continued motion of the driving member 2 can do no damage to the machine which comprises the load.

To reset the clutch, the key 37 is inserted through the cover plate 45 until the end of the key 38 rests in the socket 36. The key is then turned in clockwise direction as viewed in Fig. 1, the web 40 engaging the shoulder 35 to force the lever 9 outward into the path of the pin 7. At the same time, the shoulder 31 at the inner end of the lever is withdrawn from the notch 33 against the tension of the spring 26 and dropped into the notch 32. Each lever 9 is thus reset.

It will be noted that there are a plurality of sets of pins 7 so that the clutch may be reset in substantially any position in which it rests after the motor is stopped. I have found that it is advisable after the levers are reset to move the parts together so that the pins 7 are just about in engagement with the projecting ends 8 of the levers 9, so that there will be no shock on starting. If desired, the number of pins 7 may be increased or, instead of using the pins 7, a series of holes may be cut directly in the flange 3 so that the ends 8 of the levers 9 may project into these holes. The essential requirement is that there be engaging surfaces connected with the member 1 for contacting with the projecting ends 8.

It will be noted that the spring 26 performs a dual function in that, in its normal condition, it serves as the graduating spring for measuring the force transmitted and when this force is exceeded by raising of the shoulder 31 out of the notch 32, the spring 26 then performs the function of moving the lever 9 inward, into the notch 33 so that the outer end 8 clears the co-acting clutch member.

I consider that the proportions and positions shown and described while not of the broad essence of the invention, are highly advantageous and I shall claim the particular arrangement and proportions.

The outer arm 8 of the lever 9 is slightly inclined to the vertical or radial and the lower arm is inclined in the opposite direction. This relation is advantageous for securing sensitiveness and certainty of operation. The inclination of the line of action of the outer arm 8 is such that pressure of the pin 7 tends to draw the entire lever outward, thereby relieving any friction between the shoulder 31 and the bottom of the notch 32. At the same time the sloping face of the outer part of the lever tends to reduce friction between it and the pin 7.

The axis of the link 17 is slightly off of normal from the line joining the contact of pin 7 and lever 8 with the center of pin 28 so that as soon as the shoulder 31 is moved out of the notch the link 17 and arm 25 will tend to drop into a straight line.

I do not intend to be limited to the details shown and described.

I claim:

1. In a clutch, a driving member and a driven member, an arm having an outer end projecting normally from one member to the other and forming a connection between said members, said one member having an open notch, a yieldable element such as a spring for holding the inner end of the arm in said notch and for resisting the normal effort transmitted through said arm from one member to the other, said clutch being organized to move the arm completely out of connecting relation between the members when the resistance of the yieldable element is overcome.

2. In a clutch, a driving and a driven member a rigid arm normally projecting from one member to the other and forming a driving connection between said members, spring means for moving the connecting arm inward and for resisting the driving effort between said clutch members and relatively stationary stop means on the one member for engaging the inner end of the arm in either its driving or non-driving position.

3. In a clutch, a driving and a driven member, an arm normally projecting from one member to the other and forming a driving connection between said members, spring means for moving the connecting arm inward and for resisting the driving effort between said clutch members and stop means for holding the arm in either its driving or non-driving position, and a projection on said arm adapted to be engaged by a key for moving the arm from its non-connecting position to its connecting position.

4. In combination, a driving clutch member and a driven clutch member, a rigid arm pivoted on one member and normally engaging a shoulder on each member, in a predetermined clutching position, spring means normally under stress holding said arm in the predetermined clutching position, said members and said arm being organized to move the arm by longitudinal and rotary motion from the predetermined clutching position to a non-clutching position when the driving stress between the parts exceeds a predetermined amount as determined by the spring tension.

5. In a clutch, a driving member, a driven member, a rigid arm mounted on one of said members for motion of rotation and of translation, said arm normally engaging both of said members, spring means normally under tension holding said arm in clutching position against motion of rotation and against longitudinal motion, said members and said arm being organized to move the arm from the clutching position by motion of rotation and by longitudinal motion to a non-clutching position when the driving stress between the members exceeds the normal tension of the spring, said longitudinal motion being in a direction to relieve the spring tension of said spring means.

6. In a clutch, a wheel or disk having a peripheral cylindrical flange, a coöperating wheel or disk adapted to lie within said flange, a rigid lever pivoted on the second wheel or disk, a shoulder on the first wheel or disk being adapted to normally engage the outer end of the lever, a stop on said second wheel or disk, and a spring secured to the inner end of the lever and being adapted to hold the inner end of the lever normally against said stop, said clutch being organized to throw the lever against the tension of the spring away from said stop and longitudinally inwardly and out of engagement with said shoulder when the stress between said wheels or disks exceeds a predetermined amount.

7. In combination, a pair of wheels or disks, a link pivoted on one wheel or disk, a lever pivoted on said link and projecting into engagement with a part of the other wheel or disk, a spring for the inner end of the lever for opposing motion between said wheels or disks, a stop on said one wheel or disk for normally holding the lever in position, said lever being adapted to be shifted longitudinally out of engagement with the other wheel or disk when the stress between them becomes great enough to exceed the stress of the spring and a catch for holding the lever out of driving engagement after it has been shifted.

8. In a clutch, a first clutch member and a second clutch member, said members being adapted to be connected together normally in driving relation, a pivoted link mounted on the first clutch member, a connecting lever pivoted on the other end of said link, said lever having one end projecting from said first clutch member, said second clutch member having shoulders adapted to be engaged by the projecting end of the lever, said first clutch member having a hub, said hub having a pair of notches adjacent each other, said notches being adapted to be engaged by the inner end of the lever, spring means acting in a direction lying at an angle less than a right angle from the longitudinal axis of the lever, and being adapted to hold the end of the lever in the first notch while the lever engages one of the projections on the second clutch member.

9. In a clutch, a first clutch member and a second clutch member, said members being adapted to be connected together normally in driving relation, a pivoted link mounted on the first clutch member, a connecting lever pivoted on the other end of said link, said lever having one end projecting from said first clutch member, said second clutch member having shoulders adapted to be engaged by the projecting end of the lever, said first clutch member having a hub, said hub having a pair of notches adjacent each other, said notches being adapted to be engaged by the inner end of the lever, spring means acting in a direction lying at an angle less than a right angle from the axis of the lever and being adapted to hold the end of the lever in the first notch while the lever engages one of the projections on the second clutch member, a socket on the first clutch member and means on the lever adapted to be engaged by a resetting key for moving the lever from the second notch into engagement with the first notch on the hub.

10. In combination, a driving member, a driven member, an arm movably mounted on one member, a spring normally under tension, tending to move said arm inwardly out of contact with the other member, a catch for normally holding the arm against the tension of the spring, said arm having an integral extending trigger normally in contact with the other member, for releasing the arm from the catch and a projection on the other clutch member, said trigger being yieldingly held in engagement with said projection to transmit motion from one clutch member to the other.

11. In a clutch, an outer disk having a cylindrical flange, an inner disk having a cylindrical flange, said outer flange having a plurality of projections adapted to be engaged by releasable connecting arms, said inner flange having a slot therethrough, a connecting arm projecting through said slot and adapted to contact with one of the projections on the outer flange, said arm being mounted to have pivotal and translational movement, spring means for opposing motion of the arm and a shoulder holding the arm in projecting position.

12. In a clutch, an outer disk having a cylindrical flange, an inner disk having a cylindrical flange, said outer flange having a plurality of projections adapted to be engaged by releasable connecting arms, said inner flange having a slot therethrough, a connecting arm projecting through said slot and adapted to contact with one of the projections on the outer flange, said arm being mounted to have pivotal and translational movement, spring means for opposing motion of the arm, a shoulder holding the arm in projecting position, and a cover plate for the inner disk, said cover plate being attached to the inner flange.

13. In combination, a driving part, a driven part, a lever having an arm projecting from the one part and engaging the other part, said lever having a fulcrum mounted on a link pivoted on said one part, the projecting arm of the lever being inclined with respect to the fulcrum, in such direction that the engagement of the arm and the other clutch part tends to move the lever inwardly, a catch for the inner arm of the lever and a spring for the inner arm of the lever.

14. In combination, a driving part, a driven part, a lever having an arm projecting from the one part and engaging the other part, said lever having a fulcrum mounted on a link pivoted on said one part, the projecting arm of the lever being inclined with respect to the fulcrum, in such direction that the engagement of the arm and the other clutch part tends to move the lever outwardly, a catch for the inner arm of the lever and a spring for the inner arm of the lever, the inner arm of the lever being inclined in the opposite direction from a radial line through the fulcrum; said link being connected to said fulcrum so that its axis is slightly off of normal to the line drawn between the contact point of the outer arm of the lever and the contact point of the inner arm of the lever.

15. In a clutch, a pair of clutch members, a shoulder on the outer part of one member, a notch on the inner part of the other member, a link pivoted on said other member, a rigid arm pivoted on said link and having its outer end engaging said shoulder and its inner end engaging the notch, and a spring acting diagonally upon the inner end of the arm and tending to hold the same in said notch, 16. In a clutch, a pair of clutch members, a shoulder on the outer part of one member, a notch on the inner part of the other member, a link pivoted on said other member, a rigid arm pivoted on said link and having its outer end engaging said shoulder and its inner end engaging the notch, and a spring acting diagonally upon the inner end of the arm and tending to hold the same in said notch, and projecting means on the arm for moving the inner end of the arm back into the notch after the clutch is disengaged.

17. In a clutch, a pair of clutch members, a shoulder on the outer part of one member, a notch on the inner part of the other member, a link pivoted on said other member, a rigid arm pivoted on said link and having its outer end engaging said shoulder and its inner end engaging the notch and spring means having a component tending to move the entire arm inwardly and a component tending to move the arm rotarily about its pivot.

18. In a clutch, a first clutch member and a second clutch member, each of said clutch members having a shoulder, an arm mounted on the first clutch member and normally engaging at each end one of said shoulders, spring means for holding said arm against one of said shoulders, and means normally preventing inward motion of said arm, said arm being thrown out of contact with both shoulders when the clutch members are disengaged.

19. In a disengageable clutch, a first clutch member and a second clutch member, each of said clutch members having a shoulder, an arm mounted on the first clutch member and normally engaging at each end one of said shoulders, spring means for holding said arm against both shoulders and means normally preventing inward motion of said arm, said arm being rotatable on the first clutch member to disengage said means.

20. In a disengageable clutch a first clutch member, and a second clutch member, each of said clutch members having a shoulder, an arm mounted on the first clutch member and normally engaging at each end one of said shoulders, spring means for holding said arm against both shoulders and means normally preventing inward motion of said arm, said spring means being organized to hold the arm at its one end against said latter means, said arm being moved by a motion of rotation away from said shoulders and moved longitudinally to disengage the second clutch member.

21. In a clutch, a first clutch member and a second clutch member, a shoulder on the second clutch member, a notch in the first clutch member, a rigid arm pivoted on the first clutch member, normally engaging the shoulder on the second clutch member and having its inner end lying in said notch, spring means for holding the inner end of the arm in contact with the notch and for holding the outer arm in contact with the shoulder, said arm being moved by a motion of rotation out of the notch and being moved by a motion of translation out of engagement with the second clutch member.

22. In a clutch, a driving member and driven member, an arm having an outer end projecting normally from one member to the other and forming a connection between said members, said one member having an open notch, a yieldable element such as a spring for holding the inner end of the arm in said notch and for resisting the normal effort transmitted to said arm from one member to the other, said clutch being organized to move the arm completely out of connecting relation between the members, when the resistance of the yieldable element is overcome and a second notch on the first clutch member adjacent the first notch for catching the inner end of the arm when the clutch is disengaged.

23. In a clutch, a driving member and a driven member, an arm having an outer end projecting normally from one member to the other and forming a connection between said members, said one member having an open notch, a yieldable element such as a spring for holding the inner end of the arm in said notch and for resisting the normal effort transmitted to said arm from one member to the other, said clutch being organized to move the arm completely out of connecting relation between the members, when the resistance of the yieldable element is overcome and rotatable cam means for moving said arm outwardly so that its outer end may engage the other clutch member and so that the inner end will be moved against the tension of a spring into said notch.

24. In combination, a pair of wheels or disks, a link pivoted on one wheel or disk, a lever pivoted on said link and projecting into engagement with a part of the other wheel or disk, a spring for the inner end of the lever for opposing motion between said wheels or disks, a stop on said one wheel or disk for normally holding the lever in position, said lever being adapted to shift axially out of engagement with the other wheel or disk when the stress between them becomes great enough to exceed the stress of the spring and a catch for holding the lever out of driving engagement after it has been shifted and means for moving the lever longitudinally out of the catch and into engagement with the stop to reset the clutch.

25. In a clutch, a pair of clutch members, a link pivoted at one end on one clutch member, a lever pivoted at the other end of the link, said lever normally engaging the other clutch member and engaging a notch on said one clutch member and a spring tending to move the lever longitudinally inward and tending to oppose the rotation of the lever.

26. In a clutch a pair of members, a notch on the first member, a shoulder on the second member, a lever mounted on the first member and having its inner end engaging said notch and having its outer end engaging said shoulder, and spring means tending to move said lever longitudinally inward and tending to resist movement of the lever out of the notch.

27. In a clutch a pair of members, one of said members having an open sided notch, said notch having a side wall and a bottom wall, the other member having a shoulder, an arm mounted on the one member, the outer end of the arm engaging the shoulder, the inner end of the arm engaging the notch, means mounted on the one member and connected to the arm for permitting longitudinal and rotational movement of the lever and spring means connected to the lever for forcing the inner end of the lever into contact with the side wall and with the bottom wall of the notch.

28. In a clutch a pair of members, one of said members having an open sided notch, said notch having a side wall and a bottom wall, the other member having a shoulder, an arm mounted on the one member, the outer end of the arm engaging the shoulder, the inner end of the arm engaging the notch, means mounted on the one member and connected to the arm for permitting longitudinal and rotational movement of the lever and spring means connected to the lever for forcing the inner end of the lever into contact with the side wall and with the bottom wall of the notch, and a second notch into which said inner end of the lever drops when moved out of said first notch.

29. In a clutch a pair of members, one of said members having an open sided notch, said notch having a side wall and a bottom wall, the other member having a shoulder, an arm mounted on the one member, the outer end of the arm engaging the shoulder, the inner end of the arm engaging the notch, means mounted on the one member and connected to the arm for permitting longitudinal and rotational movement of the lever, spring means connected to the lever for forcing the inner end of the lever into contact with the side wall and with the bottom wall of the notch, a second notch into which said inner end of the lever drops when moved out of said first notch, and means on the arm by which the inner end of the arm can be moved from the second notch into the first notch to reset the clutch.

30. In a clutch, a pair of members, an arm mounted on one member, said arm having a portion extending into engaging position with respect to the other member for transmitting motion, spring means for holding the arm in clutching position, the extending portion of said arm being adapted to disengage the other member when the tension of the spring means is overcome, and rotary cam means for moving the arm against the tension of the spring into clutching position.

In witness whereof I hereunto subscribe my name this 15th day of January, A. D. 1918.

FRANK E. AURAND.